UNITED STATES PATENT OFFICE 2,072,454

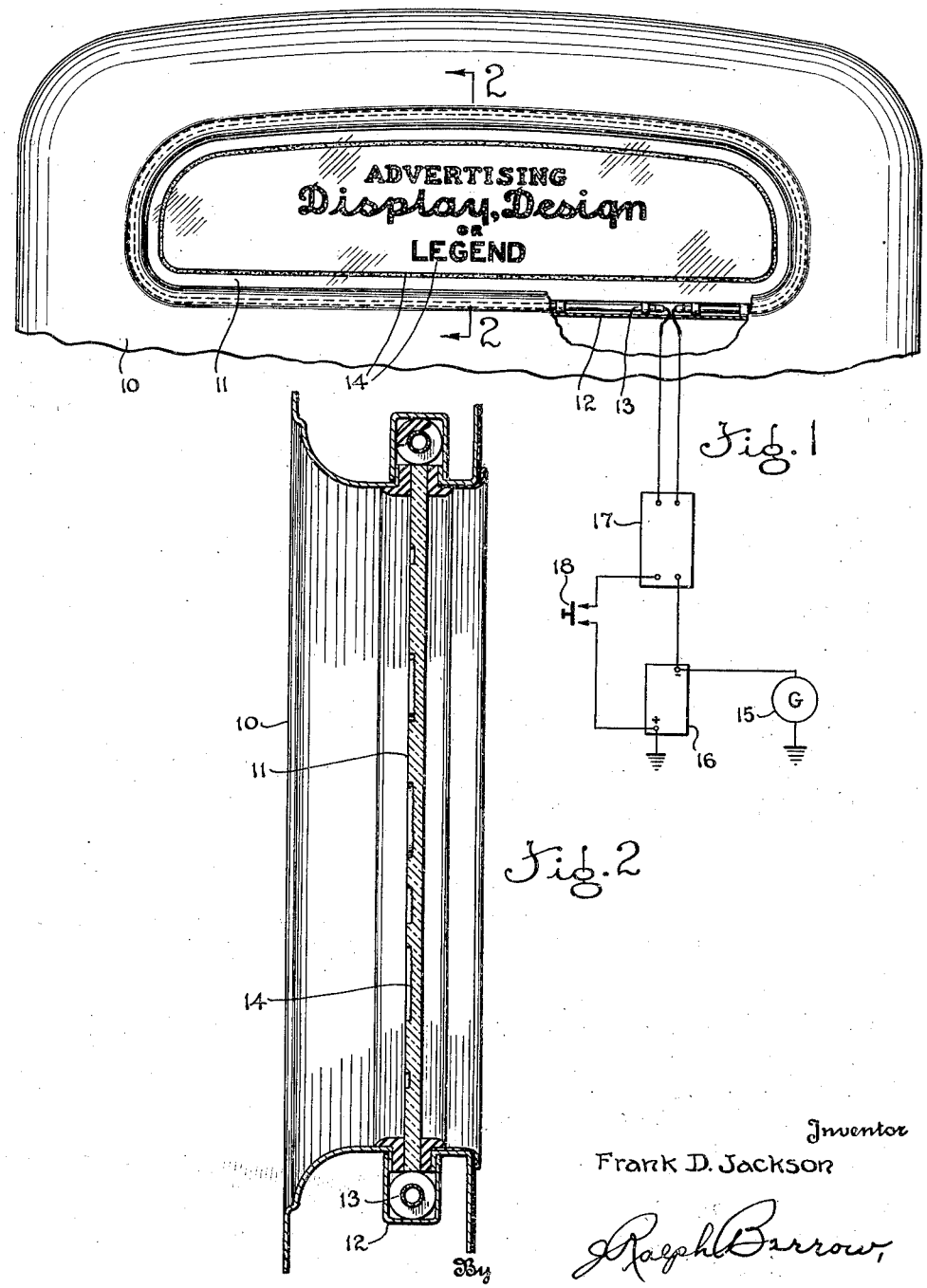

VEHICLE ADVERTISING OR DISPLAY

Frank D. Jackson, Kansas City, Mo.

Application October 27, 1936, Serial No. 107,804

5 Claims. (Cl. 40—130)

This invention relates to advertising or display vehicles including automobiles of all types, boats, airplanes and airships, trains and railway vehicles generally.

In the construction of various vehicles of the above types, windows, doors, and other portions of the vehicles are provided with transparent panes for light and for visibility. The general purpose of the present invention is to adapt these surfaces for an effective advertising or display sign symbol, design or legend in a simple, effective and economical manner. Ordinarily any form of advertising or display device applied to these surfaces interferes to a marked degree with the normal use of these panes for transmission of light and for visibility in the control of the vehicle. By the present invention a very appealing advertising or display symbol design or legend may be used on these surfaces, appearing thereon in what to the layman or general public will seem quite mysteriously and not affecting to any appreciable extent the normal light-conducting attributes of the pane.

The foregoing and other purposes of the invention are attained in the device illustrated in the accompanying drawing and described below. It is understood that the invention is applicable to vehicles generally and not limited to the specific form or application illustrated.

Of the accompanying drawing:

Figure 1 is a rear view of a portion of an automobile embodying the invention with certain units incorporated in the automobile being shown diagrammatically.

Figure 2 is a section on line 2—2 of Figure 1.

Referring to the drawing, the numeral 10 designates the body of an automobile having a window 11 therein, the rear window being shown for purposes of illustration. In the channel 12 for the pane 11 comprising the window there is housed about the edge of the pane 11 one or more sources of electric light, preferably a gas-containing tube of the neon type which may be mounted in the channel in cushioning sleeves or other supports of rubber, or the like, shown at 13. The illuminating means is preferably concealed in the channel, as shown, so that the light rays emanating therefrom travel edgewise in the glass or other material comprising the transparent pane, and normally are not visible in the glass. The channel may otherwise be incorporated into the body of the automobile in any standard or desired manner.

Suitable advertising or display signs, symbols or legends are applied to the surface of the glass as by etching, sand-blasting or otherwise "frosting" portions of the glass in any suitable way to provide surfaces as shown at 14 from which light rays in the glass are refracted or reflected and dispersed out of the plane of the pane so that at the "frosted" places the glass will glow with the light obtained from the source in the channel of the pane 11. The etching or sand-blasting or other "frosting" has negligible effect upon normal passage of light through the pane 11, and a negligible effect upon the visibility through the pane whereby it does not hamper the normal operation of the vehicle.

A supply of electricity for energizing the light source is provided by the vehicle, itself, from a generator 15 which in the case of an automobile may be the standard generator, driven by the motor. This is true also of motor boats, airplanes or the like. The generator 15, however, may be driven by the motion of the vehicle, as in a train from the wheels or axle, or from wind motors or other prime movers adapted to be driven while the vehicle is in motion.

The electrical energy is preferably delivered from the generator 15 to a battery 16, as is usual in motor-driven vehicles, and the electricity for illuminating the advertising or display may be drawn from the battery whether the motor is operating or not and whether the vehicle is at a standstill or in motion.

Where a neon type of tube is used as the illuminating means, the required alternating current at the required voltage may be obtained from the battery 16 through a "pack" 17 comprising a suitable vibrator and transformer as will be understood by those skilled in electrical arts.

To control operation of the advertising or display, a switch 18 may be provided to control supply of electricity to the light source. This can be arranged adjacent the vehicle controls.

As will be obvious from the foregoing description, a vehicle glass pane which when not illuminated does not appreciably look different from an ordinary glass pane in a vehicle and which provides about as much interior light and about as much visibility for vehicle operator as an ordinary glass pane, may be caused to glow at the etched, sand-blasted or otherwise "frosted" portions in a very effective manner. It will also be apparent that the illuminating tube is effectively housed so that it is not subject to being accidentally broken.

It will be apparent too, that by the incorporation of the illuminated medium in the vehicle structure about the edge of the transparent pane on which the design is provided by light-diverting surfaces in the pane, the vehicle may be washed and the pane cleaned in the usual way, there being no obstructing sign elements and nothing to be removed for such purpose or likely to be broken during the cleaning process.

Modifications of the invention may be resorted to without departing from the spirit thereof or the scope of the appended claims.

What is claimed is:

1. The combination in a motor vehicle, of a panel of light-conducting material in the body thereof comprising a window for transmitting light and permitting vision, means comprising a neon or like tube arranged at the edge of said panel in the vehicle body for directing rays of light edgewise through said panel in the plane thereof, said panel having portions of its surface so treated as to intercept said rays and reflect or refract the same out of the plane of said panel to provide an illuminated display on face of the panel, a storage battery in said motor vehicle, and means for energizing said neon tube.

2. The combination in a motor vehicle, of a panel of light-conducting material in the body thereof comprising a window for transmitting light and permitting vision, means comprising a neon or like tube arranged at the edge of said panel in the vehicle body for directing rays of light edgewise through said panel in the plane thereof, a housing for concealing said neon or like tube therein at the edge of the panel and permitting light to emanate therefrom only edgewise into the panel, said panel having portions of its surface so treated as to intercept said rays and reflect or refract the same out of the plane of the panel to provide an illuminated display on face of the panel, and means for energizing said neon tube.

3. The combination in a motor vehicle, of a panel of light-conducting material in the body thereof comprising a window for transmitting light and permitting vision, means comprising a neon or like tube arranged at the edge of said panel in the vehicle body for directing rays of light edgewise through said panel in the plane of the panel, a housing for concealing said neon or like tube therein at the edge of the panel and permitting light to emanate therefrom only edgewise into the panel, cushioning mountings in said housing for said tube, said panel having portions of its surface so treated as to intercept said rays and reflect or refract the same out of the plane of the panel to provide an illuminated display on face of the panel, and means for energizing said neon tube.

4. A vehicle advertising or display device including a pane of transparent material comprising a window of the vehicle for transmission of light and for visibility, electrical means arranged at an edge of the panel in the vehicle body for illuminating the panel at an edge thereof whereby rays of light will pass edgewise through the panel in the plane thereof, said panel having thereon surfaces providing a sign symbol or legend for diverting the light rays from the plane of the panel, and means for energizing said electrical illuminating means.

5. A vehicle advertising or display device including a pane of transparent material comprising a window of the vehicle for transmission of light and for visibility, electrical means arranged in the vehicle body at the edge of the panel for illuminating the panel at an edge thereof whereby rays of light will pass edgewise through the panel in the plane thereof, said panel having thereon surfaces providing a sign symbol or legend for diverting the light rays from the plane of the panel.

FRANK D. JACKSON.